United States Patent [19]
Dickey

[11] Patent Number: 5,832,880
[45] Date of Patent: Nov. 10, 1998

[54] APPARATUS AND METHOD FOR CONTROLLING HOMOGENEOUS CHARGE COMPRESSION IGNITION COMBUSTION IN DIESEL ENGINES

[75] Inventor: Daniel W. Dickey, Helotes, Tex.

[73] Assignee: Southwest Research Institute, San Antonio, Tex.

[21] Appl. No.: 905,789

[22] Filed: Jul. 28, 1997

[51] Int. Cl.[6] .................................................. F02B 47/00
[52] U.S. Cl. ........................................ 123/25 C; 123/294
[58] Field of Search .................... 123/25 R, 25 C, 123/304, 294, 568

[56] References Cited

U.S. PATENT DOCUMENTS

| | | | |
|---|---|---|---|
| 4,502,420 | 3/1985 | Mezger | 123/25 C |
| 4,558,665 | 12/1985 | Sandberg et al. | 123/25 C |
| 4,884,533 | 12/1989 | Risitano et al. | 123/25 C |
| 4,960,080 | 10/1990 | O'Neill et al. | 123/254 |
| 5,078,107 | 1/1992 | Morikawa | 123/305 |
| 5,086,737 | 2/1992 | Watanabe et al. | 123/295 |
| 5,148,776 | 9/1992 | Connor | 123/25 J |
| 5,174,247 | 12/1992 | Tosa et al. | 123/25 C |
| 5,222,481 | 6/1993 | Morikawa | 123/435 |
| 5,243,940 | 9/1993 | Gopel | 123/299 |
| 5,271,370 | 12/1993 | Shimada et al. | 123/568 |
| 5,450,829 | 9/1995 | Beck | 123/435 |
| 5,549,087 | 8/1996 | Gray, Jr. et al. | 123/254 |
| 5,555,868 | 9/1996 | Neumann | 123/275 |

*Primary Examiner*—John T. Kwon
*Attorney, Agent, or Firm*—Jenkens & Gilchrist

[57] ABSTRACT

A closed-loop control system controls the timing and amount of water injected into a combustion chamber of a homogeneous charge compression ignition diesel engine to regulate the start of combustion during the compression stroke or early in the expansion stroke of each combustion cycle. A sensor is used to detect the start of combustion and deliver a signal to an engine control unit to adjust water injection timing and quantity, on a cycle-by-cycle basis, to obtain the desired start of combustion during each compression stroke of the engine. The present invention effectively overcomes the problem of repeatable and accurate control of the start of combustion in diesel engines operating in a homogeneous charge compression ignition mode.

14 Claims, 2 Drawing Sheets

APPARATUS AND METHOD FOR CONTROLLING HOMOGENEOUS CHARGE COMPRESSION IGNITION COMBUSTION IN DIESEL ENGINES

BACKGROUND OF THE INVENTION

1. Technical Field

This invention relates generally to an apparatus and method for controlling the start of combustion in a compression ignition engine, and more particularly to such an apparatus and method in which the air-fuel mixture is pre-mixed to form a homogeneous mixture within the combustion chamber prior to the start of combustion in each compression stroke.

2. History of Related Art

Homogeneous charged compression ignition (HCCI) is a mode of combustion in which a premixed air/fuel charge is elevated in temperature during the compression stroke until the thermodynamic conditions of the premixed charge are satisfactory for the initiation of combustion. HCCI combustion occurs when a lean homogeneous mixture of diesel fuel and air begins combustion toward the end of the engine compression stroke. A homogeneous mixture of fuel and air can be created using a conventional automotive-style port fuel injector or by early, i.e., near bottom dead center (BDC), direct in-cylinder fuel injection. The thermodynamic conditions and temperature-time history of the mixture must be correct for pre-flame reactions and combustion to occur. HCCI combustion is characterized by multiple combustion sites in a lean fuel charge so that the peak flame temperature is similar to the bulk gas temperature. The low peak flame temperature, relative to conventional diesel diffusion flame combustion, results in $No_x$ emissions that are from 90% to 98% lower than the conventional diesel engine combustion.

However, heretofore this mode of combustion has been difficult to control, primarily due to an inability to accurately and repeatably control the start of combustion (SOC) for each compression stroke. If the conditions are not favorable for combustion, misfire will occur. For example, if the start of combustion occurs too early, the mixture will burn during the compression stroke, resulting in possible engine damage and poor cycle efficiency. Also, early SOC contributes to high gas temperatures in the next engine cycle, which will again lead to early SOC. Typically, exhaust gas recirculation (EGR) is used in an HCCI engine to raise the intake gas temperature to a level where HCCI combustion will occur. The recirculated exhaust gas is a diluent that can also control combustion rate. Combustion boundaries are leanmisfire on one side, and knock on the other side.

The present invention is directed to overcoming the above-stated problems associated with controlling the start of combustion in a homogeneous charge compression ignition diesel engine. It is, therefore, desirable to have an apparatus and a method whereby the start of combustion in an HCCI engine can be accurately, reliably, and repeatably controlled on a cycle-by-cycle basis.

SUMMARY OF THE INVENTION

In accordance with one aspect of the present invention, an apparatus for controlling the start of combustion in a combustion chamber of a diesel engine operating in a homogeneous charge compression ignition combustion mode includes a start of combustion sensor in communication with the combustion chamber of the diesel engine and an injection nozzle having at least a tip portion disposed in the combustion chamber of the diesel engine. The apparatus also includes a reservoir adapted to provide a source of water and a pump disposed in fluid communication with the reservoir and the injection nozzle and is arranged to deliver water at a predetermined pressure to the injection nozzle. The apparatus further includes a piston position sensor adapted to transmit an electrical signal correlating with the real-time position of the piston within the combustion chamber. An electronic control unit is in electrical communication with the injection nozzle, the start of combustion sensor, and the piston position sensor. The electronic control unit is adapted to deliver an electrical signal to the injection nozzle for controlling the timing and the length of time that the injection nozzle injects water into the combustion chamber of the engine.

Other features of the apparatus for controlling the start of combustion in a combustion chamber of a diesel engine operating in a homogeneous charge compression ignition combustion mode include a fuel injector, either disposed in an inlet air passageway to the combustion chamber, or within the chamber itself. The fuel injector may be incorporated with the water injection nozzle as a single wherein the fuel is injected into the chamber for a first period of time in the combustion cycle and water is injected into the chamber during a later-occurring second period of time in the combustion cycle.

Additional features of the apparatus for controlling the start of combustion in a combustion chamber of a diesel engine operating in a homogeneous charge compression ignition combustion mode include the diesel engine having a plurality of cylinders each of which is adapted to operate in a homogeneous charge compression ignition combustion mode with each of the cylinders having the apparatus comprising the present invention for controlling the start of combustion in a combustion chamber of a diesel engine. Other features of the apparatus include a means for recirculating a portion of the gas discharged from an exhaust port of the combustion chamber to an inlet port of the combustion chamber. Still additional features include the start of combustion sensor being an optical sensor or a pressure sensor, and the piston position sensor being a crankshaft position sensor.

In accordance with another aspect of the present invention, a method for controlling the start of combustion in a combustion chamber of a diesel engine operating in a homogeneous charge compression combustion mode includes injecting a controlled amount of fuel into the chamber, introducing either intake air or a mixture of intake air and recirculated exhaust gas into the chamber, and mixing the injected fuel with the intake air or mixture of intake air and recirculated exhaust gas to form a substantially homogenous mixture of fuel and air that is substantially uniformly dispersed within the chamber. The method for controlling the start of combustion in a combustion chamber of a diesel engine operating in a homogeneous charge compression combustion mode also includes compressing the homogeneous mixture of fuel and air in the chamber in response to moving a piston disposed in the chamber in a direction whereby the volumetric displacement of the chamber is reduced, and the pressure and temperature of the homogeneous mixture is increased to respective values sufficient to initiate combustion of the homogeneous mixture of fuel and air. The method further includes sensing the real-time position of the piston disposed in the combustion chamber, sensing the start of combustion of a homogeneous mixture of fuel and air in the chamber, and injecting water into the chamber in response to sensing the real-time position of the piston and the start of combustion of the fuel mixture in the chamber, thereby controlling the start of combustion so that the start of combustion occurs at a desired time during the compression stroke or very early in the expansion stroke of the engine.

Other features of the method of controlling the start of combustion in a combustion chamber of a diesel engine operating in a homogeneous charge compression combustion mode includes injecting the fuel either through an injection nozzle disposed in an intake port of the engine or, alternatively, injecting the fuel through an injection nozzle disposed in the combustion chamber. Another feature of the method includes injecting the controlled amount of fuel into the chamber at a first selected time prior to combustion and injecting water into the chamber at a second selected time in the combustion cycle after the first preselected time. Depending on operating conditions and/or particular engine configuration, water injection may occur before, during, or after fuel injection. Still another feature of the method includes the method being carried out in a diesel engine having a plurality of cylinders with the method for controlling the above-described method for controlling the start of combustion in a combustion chamber of a diesel engine being carried out during each compression stroke of each cylinder of the multi-cylinder engine.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
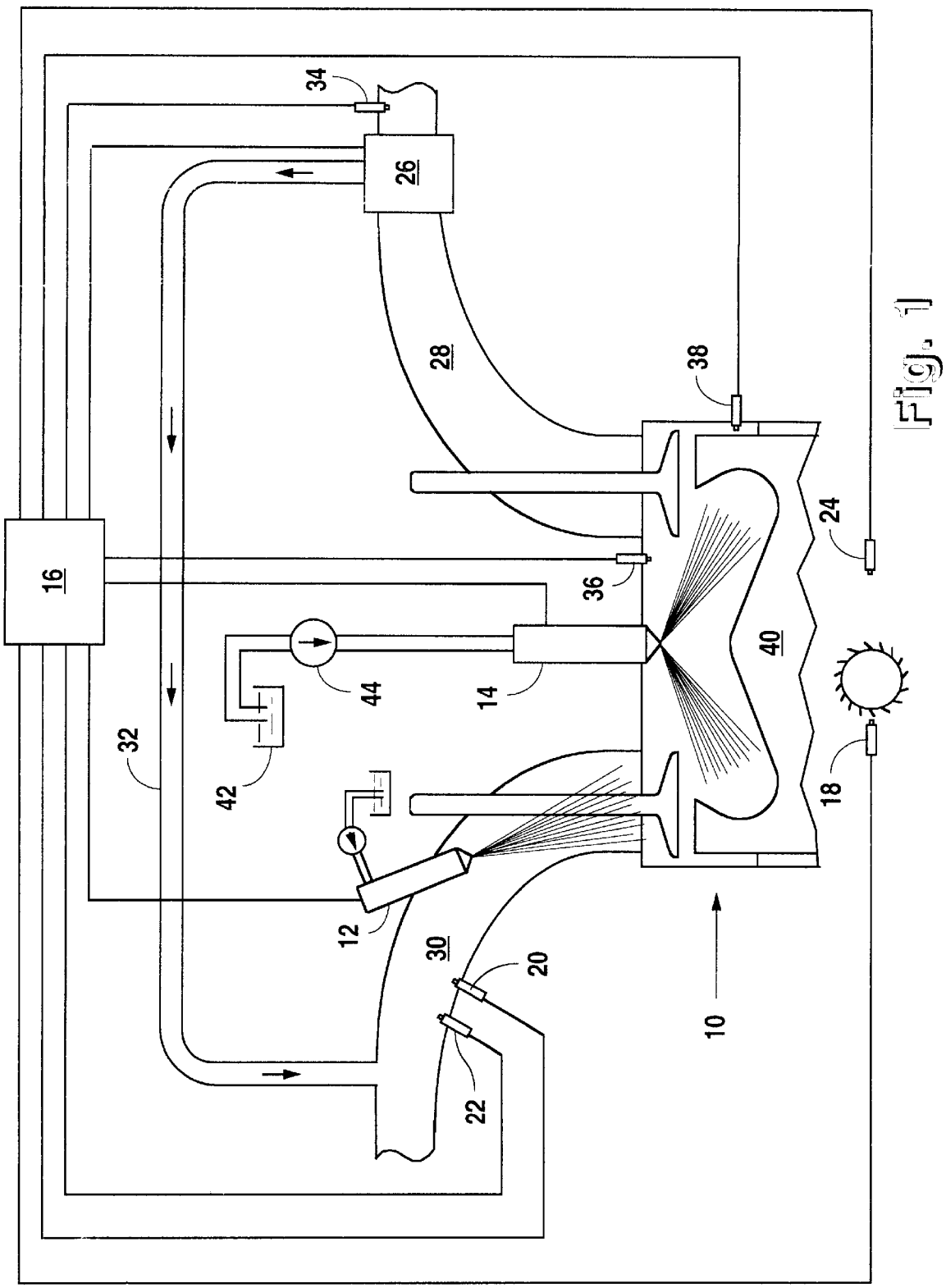
FIG. 1 is a schematic representation of the first arrangement of the apparatus embodying the present invention, wherein fuel is introduced into the combustion chamber of a diesel engine through a port fuel injector.
Figure 2:
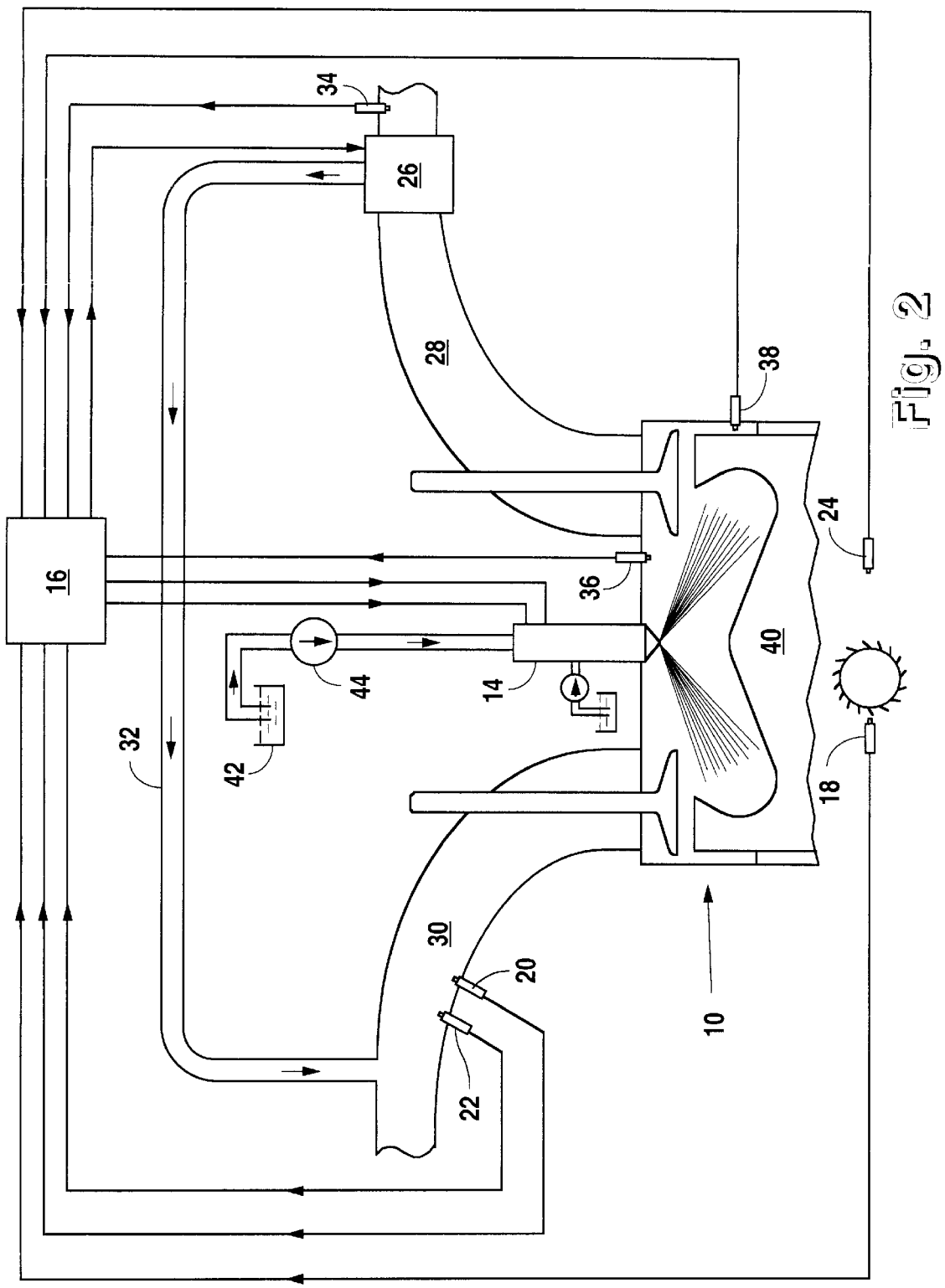
FIG. 2 is a schematic representation of a second arrangement of the apparatus embodying the present invention, wherein fuel is introduced into the engine through an in-cylinder fuel injector.

A homogeneous charge compression ignition diesel engine is controlled in a similar way as conventional diesel engines. FIGS. 1 and 2 are similar except for the manner in which fuel is introduced into a combustion chamber 10. In FIG. 1, fuel is introduced into the engine through a port diesel fuel injector 12 disposed in the intake manifold 30 of the engine, and in FIG. 2 through a direct injection in-cylinder injector 14 having a tip portion disposed within the combustion chamber 10. An engine electronic control unit 16 (ECU), of the type commonly used to control various engine operating parameters, is connected to an engine speed sensor 18 which detects rotational speed and real-time rotation angle position of the engine crankshaft, an intake manifold pressure sensor 20, an intake manifold temperature sensor 22, an engine coolant temperature sensor 24 and, if desired as a feedback signal, to a wide-ratio oxygen sensor 34. These sensors, in like manner as found in conventional diesel engine controls, deliver electronic signals to the ECU 16 whereat the quantity and timing of fuel injection into the cylinder 10 is calculated based upon the value of these and, if appropriate, other sensed parameters. The ECU 16 then delivers control signals to the port fuel injector 12, as shown in FIG. 1, or the in-cylinder injector 14, as shown in FIG. 2.

The actual fuel quantity injected into the chamber during each combustion cycle will determine the fuel/air ratio and the engine output power.

Exhaust gas recirculation (EGR) is used in homogeneous charge compression ignition diesel engines to control ignition and provide a source of heated air to assure a favorable intake charge temperature for HCCI combustion. In both embodiments of the present invention, exhaust gas recirculation is provided by an EGR valve 26 disposed in the exhaust manifold 28 of a combustion chamber 10, with exhaust gas flow to the intake manifold 30 being delivered by way of an EGR passageway 32 extending between the EGR valve 26 and the intake manifold 30. Desirably, the recirculated exhaust gas is introduced into the intake manifold 30 at a point upstream of the intake manifold pressure sensor 20 and the intake manifold temperature sensor 22. The exhaust gas recirculation flow rate is controlled by the ECU 16 by regulation of the position of the EGR valve 26 so that a desired flow rate of recirculated gas is directed to the intake port of the engine. An excessive amount of exhaust gas recirculation results in high intake air temperature and early start of combustion (SOC). Low exhaust gas recirculation rate may result in low intake air temperatures and mis-fire in an HCCI engine.

Importantly, in both fuel-delivery embodiments of the present invention, an optical or pressure type start-of-combustion sensor 36 provides a feedback signal to the engine electronic control unit 16 so that the ECU 16 can alter exhaust gas recirculation flow rate and/or other variables to control the start of combustion and produce efficient, low emission HCCI engine combustion. The SOC sensor 36 can detect premature or late start of combustion in the chamber, i.e., with respect to the position of a piston 40 in the chamber 10, and provide a representative signal to the ECU 16. Additionally, a knock sensor 38 may be used to provide a feedback signal to the ECU 16 to avoid damaging engine knock.

The parameters used to control the start of combustion for homogeneous charge compression ignition are typically intake air temperature, exhaust gas recirculation flow rate, and compression ratio. Heretofore, it has not been possible to control these parameters on a cycle-by-cycle basis. For example, if the EGR flow rate is changed, it may take several engine cycles to affect an appreciable difference in intake manifold temperature due to the transport time and thermal inertia of the EGR system. Therefore, accurate cycle-by-cycle control of the start of combustion for HCCI operation is essential for optimum performance and emissions control.

In the present invention, either an in-cylinder or a port water injector may be used to inject water into the homogeneous fuel/air mixture to control charge temperature and the SOC. The in-cylinder injector 14, as shown in FIGS. 1 and 2, is in fluid communication with a source of pressurized water. The timing and length of time in which the injector port is open, and water discharged into the combustion chamber 10, is controlled by an electrical signal delivered by the electronic control unit 16.

Thus, the quantity of water injected can be changed for each injection event for every engine cycle. Assuming that the compression ratio, i.e., the position of the piston 40 within the chamber 10, and the temperature of the intake fuel/air mixture are more than sufficient to initiate early combustion, the water injection quantity can be changed on a cycle-by-cycle basis to control the SOC. Injecting water into the combustion chamber 10 will reduce the in-cylinder gas temperature to the level required to start combustion at the desired ignition point, i.e., the desired crank angle before TDC. Injecting larger water quantities will retard the start of combustion.

The in-cylinder injector 14 may be either a dual fluid injector, adapted to separately inject either water or diesel fuel at desired times during the compression stroke, or when used in conjunction with the port fuel injector 12, may comprise a single fluid water injector. Also, diesel fuel may be injected directly into the combustion chamber 10 by a separate in-cylinder fuel injector, not shown. Water from an appropriate source as a tank or reservoir 42, in fluid communication with a pump 44, advantageously provides a source of pressurized water to the in-cylinder injector 14. As mentioned above, the actual timing and the amount of water injected into the combustion chamber 10, i.e., the length of time that the in-cylinder injector nozzle is opened, is controlled by the ECU 16. The in-cylinder injector 14 has at least a tip portion of the injector disposed within the combustion chamber 10.

The engine speed sensor 18 typically detects engine speed by sensing the rotation of a known number of features, such as magnetic markers or gear teeth, that are mechanically connected to the engine crankshaft in a predetermined relationship. Since the circumferential position of the magnetic markers or other features on the crankshaft is known, the real-time position of the crankshaft, commonly referred to as the crank angle, is also known. Furthermore, since the piston 40 is mechanically attached to the crankshaft via a connecting rod and associated bearings, the real-time position of the piston 40 with respect to the combustion chamber 10 can also be readily determined. Thus, the engine speed sensor 18 may be considered as a piston position sensor for determining the position of the piston 40 at a particular time during the compression stroke.

When fuel and water are directly injected into the engine, either by a single injection nozzle 14, or by way of separate in-cylinder injection nozzles, not shown, fuel is desirably injected into the chamber 10 at a first selected time, as controlled by the ECU 16, during an early phase of the compression stroke of the cylinder operating cycle, e.g., near BDC. Water is injected into the chamber 10 at a second selected time, as controlled by the ECU 16, during the same compression stroke of the cylinder operating cycle. Generally, water is injected into the chamber 10 at a later time than that at which fuel is injected into the chamber 10, to permit homogeneous mixing of the fuel and intake air charge prior to water injection. However, depending on operating conditions and/or the particular engine configuration, water injection may occur before, during, or after fuel injection to regulate the start of, and control the rate of, combustion. More specifically, depending on combustion timing, water may advantageously be injected during the compression stroke or very early in the expansion stroke.

More specifically, a method for controlling the start of combustion in the combustion chamber of a diesel engine operating in a homogeneous charge compression combustion mode, using the above-described apparatus, includes injecting a controlled amount of fuel into the chamber, and then introducing either intake air or a mixture of intake air and recirculated exhaust gas into the chamber. Fuel injection and introduction of the intake air charge may be carried out simultaneously when the apparatus includes a port fuel injector, or separately when using an in-cylinder fuel injector, as shown in FIG. 2. The injected fuel and intake air charge are mixed, either partially within the intake manifold, or completely within the combustion chamber 10, to form a substantially homogeneous mixture of fuel and air that is substantially uniformly disbursed within the combustion chamber 10. The homogeneous mixture of fuel and air in the combustion chamber 10 is compressed in response to moving the piston 40 upwardly to decrease the volumetric displacement of the chamber, whereupon the pressure and temperature of the homogeneous fuel/air mixture is increased to respective values that are sufficient to initiate combustion of the homogeneous mixture of fuel and air. During a typical compression stroke, the temperature and pressure of the fuel/air mixture may have values sufficient to initiate the start of combustion prior to the desired point in the compression stroke. If the early SOC condition is present, injection of water into the chamber 10 cools the air/fuel mixture and delays the start of combustion until a desired point in the compression stroke.

HCCI combustion is becoming increasingly important as an emission control technique. However, as discussed above, HCCI combustion has heretofore been difficult to control, primarily because the start of combustion was randomly variable and could not be controlled to begin at a desired time in the compression stroke. Consequently, misfires or knock would occur, both of which are detrimental to effective emission control and undesirable from an engine operating aspect. The closed-loop control system described above effectively controls water injection timing and quantity, and thereby effectively controls the start of combustion in the combustion chamber of an HCCI engine in which the fuel/air mixture has sufficient pre-flame reactions, sufficient temperature and pressure, for combustion to occur.

Although the present invention is described in terms of preferred exemplary embodiments, with specific illustrative fuel injection arrangements and sensors for controlling various engine operating parameters, those skilled in the art will recognize changes in those arrangements and types of sensors may be made without departing from the spirit of the invention. Such changes are intended to fall within the scope of the following claims. Other aspects, features, and advantages of the invention may be obtained from the study of this disclosure and the drawings, along with the appended claims.

What is claimed is:

1. An apparatus for controlling the start of combustion in a combustion chamber of a diesel engine operating in a homogeneous charge compression ignition combustion mode, comprising:

an injection nozzle having at least a tip portion thereof disposed in the combustion chamber of said diesel engine;

a reservoir adapted to provide a source of water;

a pump disposed in fluid communication with said reservoir and said injection nozzle and adapted to deliver water at a predetermined pressure to said injection nozzle;

a sensor adapted to detect the start of combustion in the combustion chamber of said engine and transmit an electrical signal in response to detecting the start of combustion;

a sensor adapted to determine the real-time position of a piston disposed in said combustion chamber of the engine and transmit an electrical signal correlating with said determined real-time position of the piston; and an electronic control unit in electrical communication with said injection nozzle, said sensor adapted to detect the start of combustion in the combustion chamber and said sensor adapted to determine the real-time position of a piston disposed in said combustion chamber of the engine, said electronic control unit being adapted to deliver an electrical signal to the injection nozzle for controlling the timing and the length of time that said injection nozzle injects water into said combustion chamber of the engine in response to the value of electrical signals delivered to said electronic control unit from said start of combustion sensor and said piston position sensor.

2. An apparatus for controlling the start of combustion in a combustion chamber of a diesel engine operating in a homogeneous charge compression ignition combustion mode, as set forth in claim 1, wherein said engine includes a port fuel injector nozzle disposed in an inlet air passageway to said combustion chamber.

3. An apparatus for controlling the start of combustion in a combustion chamber of a diesel engine operating in a homogeneous charge compression ignition combustion mode, as set forth in claim 1, wherein said engine includes a fuel injector disposed in said combustion chamber.

4. An apparatus for controlling the start of combustion in a combustion chamber of a diesel engine operating in a homogeneous charge compression ignition combustion mode, as set forth in claim 1, wherein said injection nozzle is also in fluid communication with a pressurized source of fuel and is adapted to inject fuel into said chamber for a first determined period of time in one of an intake stroke and a compression stroke of a combustion cycle, and inject water into said chamber for a second, separately determined period of time.

5. An apparatus for controlling the start of combustion in a combustion chamber of a diesel engine operating in a homogeneous charge compression ignition combustion mode, as set forth in claim 1, wherein said diesel engine in a multi-cylinder engine in which each of said cylinders is adapted to operate in a homogeneous charge compression ignition combustion mode and each of said cylinders include said apparatus for controlling the start of combustion in a combustion chamber of a diesel engine operating in a homogeneous charge compression ignition combustion mode.

6. An apparatus for controlling the start of combustion in a combustion chamber of a diesel engine operating in a homogeneous charge compression ignition combustion mode, as set forth in claim 1, wherein said apparatus includes a means for recirculating a portion of the gas discharged from an exhaust port of said combustion chamber into an inlet port of said combustion chamber.

7. An apparatus for controlling the start of combustion in a combustion chamber of a diesel engine operating in a homogeneous charge compression ignition combustion mode, as set forth in claim 1, wherein said sensor adapted to detect the start of combustion in the combustion chamber of said engine and transmit an electrical signal in response to detecting the start of combustion is an optical sensor.

8. An apparatus for controlling the start of combustion in a combustion chamber of a diesel engine operating in a homogeneous charge compression ignition combustion mode, as set forth in claim 1, wherein said sensor adapted to detect the start of combustion in the combustion chamber of said engine and transmit an electrical signal in response to detecting the start of combustion is a pressure sensor.

9. An apparatus for controlling the start of combustion in a combustion chamber of a diesel engine operating in a homogeneous charge compression ignition combustion mode, as set forth in claim 1, wherein said sensor adapted to determine the real-time position of a piston disposed in said combustion chamber of the engine and transmit an electrical signal in correlating with said determined real-time position of the piston is a crankshaft position sensor.

10. A method for controlling the start of combustion in a combustion chamber of a diesel engine operating in a homogeneous charge compression combustion mode, comprising:

injecting a controlled amount of fuel into said chamber;

introducing at least one of intake air and a mixture of intake air and recirculated exhaust gas into said chamber;

mixing said injected fuel with said at least one of intake air and a mixture of intake air and recirculated exhaust gas to form a substantially homogenous mixture of fuel and air that is substantially uniformly dispersed within said chamber;

compressing said homogeneous mixture of fuel and air in said chamber in response to moving a piston disposed in said chamber in a direction whereby the volumetric displacement of said chamber is reduced and the pressure and temperature of said homogeneous mixture is increased to respective values sufficient to initiate combustion of said homogeneous mixture of fuel and air;

sensing the real-time position of said piston disposed within the combustion chamber;

sensing the start of combustion of the homogeneous mixture of fuel and air in said chamber; and injecting water into said chamber in response to sensing the real-time position of said piston and the start of combustion of the fuel mixture in said chamber and thereby controlling the start of combustion so that the start of combustion occurs at a desired time during one of a compression stroke or early in an expansion stroke of said piston.

11. A method for controlling the start of combustion in a combustion chamber of a diesel engine operating in a homogeneous charge compression combustion mode, as set forth in claim 10, wherein said injecting a controlled amount of fuel into said chamber includes injecting said fuel through an injection nozzle disposed in an intake port of said engine.

12. A method for controlling the start of combustion in a combustion chamber of a diesel engine operating in a homogeneous charge compression combustion mode, as set forth in claim 10, wherein said injecting a controlled amount of fuel into said chamber includes injecting said fuel through an injection nozzle disposed in said combustion chamber.

13. A method for controlling the start of combustion in a combustion chamber of a diesel engine operating in a homogeneous charge compression combustion mode, as set forth in claim 10, wherein said injecting a controlled amount of fuel into said chamber includes injecting fuel into said chamber for a first determined period of time in one of an intake stroke and a compression stroke of a combustion cycle, and said injecting water into said chamber in response to sensing the real-time position of said piston and the start of combustion of the fuel mixture in said chamber includes injecting said water into said chamber for a second, separately determined period of time.

14. A method for controlling the start of combustion in a combustion chamber of a diesel engine operating in a homogeneous charge compression combustion mode, as set forth in claim 10, wherein said diesel engine is a multi-cylinder engine and said method for controlling the start of combustion in a combustion chamber of a diesel engine includes carrying out said method during each compression stroke of each cylinder of the multi-cylinder engine.

\* \* \* \* \*